Figure 3:
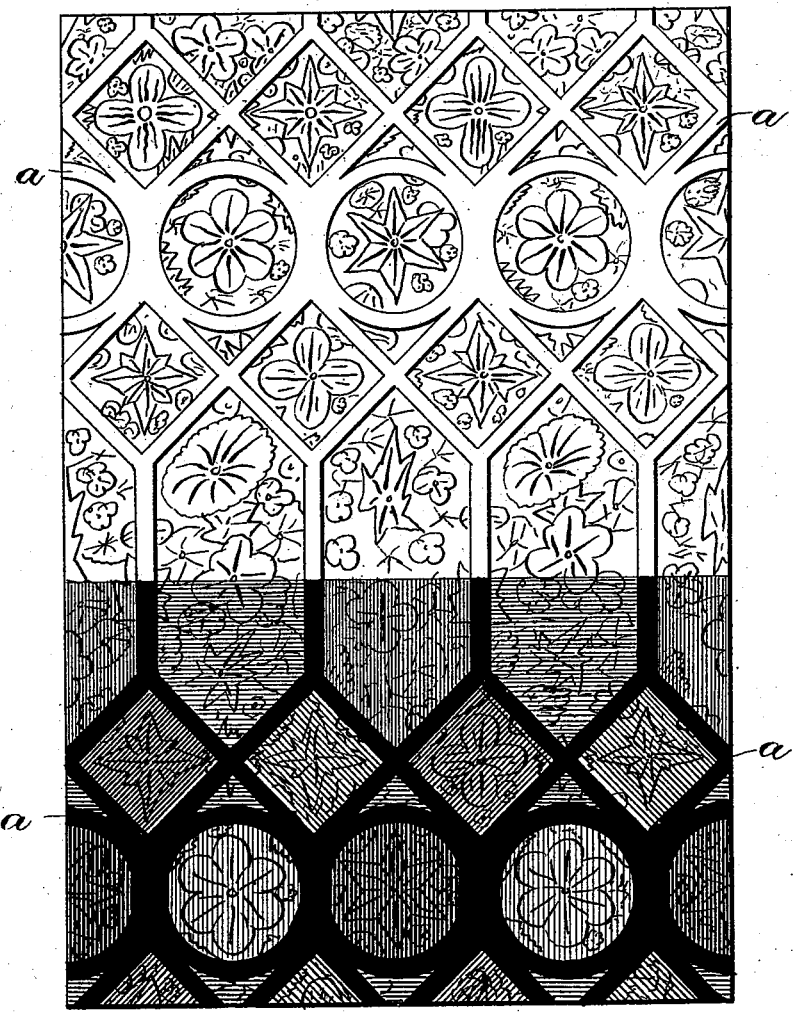

(No Model.) 2 Sheets—Sheet 1.
E. WALSH, Jr.
PROCESS OF MAKING IMITATION LEADED GLASS.
No. 511,568. Patented Dec. 26, 1893.
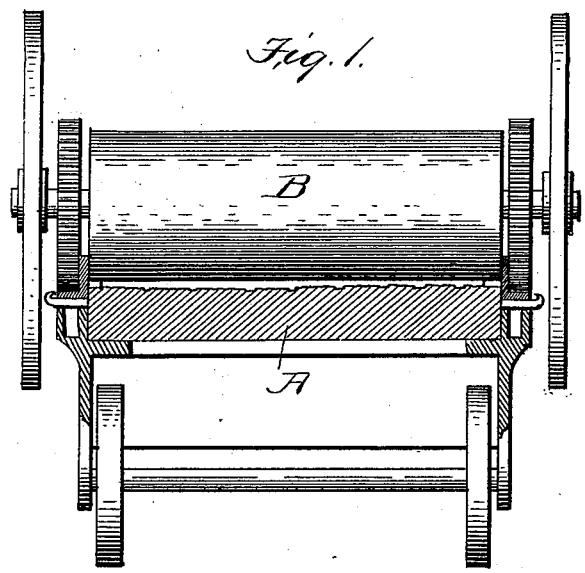
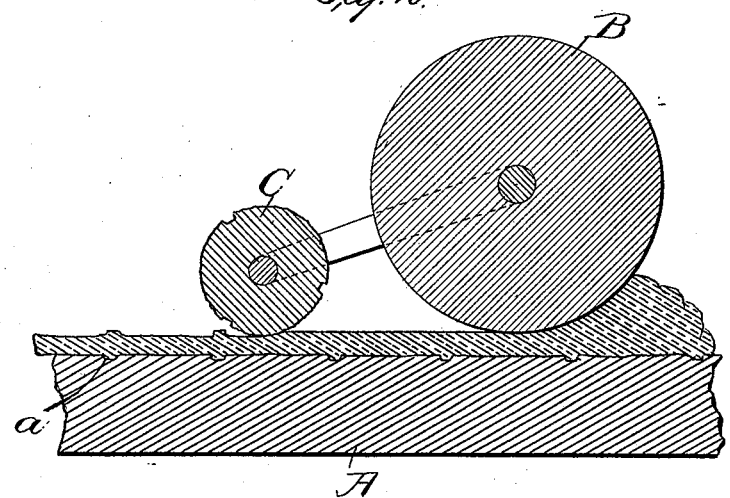
Witnesses
F. R. Cornwall
Hugh K. Wagner
Inventor
Edward Walsh, Jr.
By Paul Bakewell
Atty (No Model.) 2 Sheets—Sheet 2.
E. WALSH, Jr.
PROCESS OF MAKING IMITATION LEADED GLASS.
No. 511,568. Patented Dec. 26, 1893.

Witnesses
F. R. Cornwall
Hugh H. Wagner

Inventor
Edward Walsh Jr.
By Paul Bakewell
Atty.

UNITED STATES PATENT OFFICE.

EDWARD WALSH, JR., OF ST. LOUIS, MISSOURI.

PROCESS OF MAKING IMITATION LEADED GLASS.

SPECIFICATION forming part of Letters Patent No. 511,568, dated December 26, 1893.

Application filed March 7, 1893. Serial No. 464,951. (No specimens.)

*To all whom it may concern:*

Be it known that I, EDWARD WALSH, Jr., a citizen of the United States, residing at St. Louis, in the State of Missouri, have invented a certain new and useful Improvement in Processes of Making Imitation Leaded Glass, of which the following is a full, clear, and exact description, such as will enable others skilled in the art to which it appertains to make and use the same.

Heretofore in the manufacture and construction of the article that is known to the trade as "leaded" glass, it has been customary to construct that article by carefully cutting and fitting small pieces of glass into divers shapes both curved and angular and connecting or securing said pieces of glass, which may or may not be of the same color or class of glass as the maker dictates, by what is known as the "lead." This lead as it is known comes in the form of a continuous strip and in cross section being in the form of an "I" into the side recesses of which the glass is received, being supported and held in position by the flanges. The resultant product of this method of manufacture is not only costly in the extreme, requiring much time and labor and considerable accuracy in the fitting into position of the many pieces going to make up a plate of glass, but it is also very weak and will not stand much lateral pressure. Moreover in its course of manufacture should it be desired to incorporate into the sheet of glass, pieces of differently colored glass, or glass made by different processes of manufacture, it is necessary that the constructor have on hand many kinds and colors from which to select the different pieces which go to make up an artistic design, thus consequently greatly augmenting the cost of the product.

My invention has for its object the production of a sheet of glass provided on one or both of its faces, with raised ribs, or what is known to the trade, as imitation lead.

Another object of this invention resides in the process of manufacture wherein the surfaces of glass in a plane below the ribs may be ornamented with different designs in imitation of different manufactures of glass, such ornamented portions and raised ribs being ornamented or colored with any suitable pigment which is fused into and becomes part of the sheet of glass. These objects I accomplish by a construction illustrated in the accompanying drawings, wherein like symbols of reference refer to like parts wherever they occur, in which—

Figure 4:
Figure 5:

Figure 1. is a cross sectional view through a glass casting table bed and its associate roller. Fig. 2. is a detail transverse section through the flattening roller and following roll, taken longitudinally of the bed, showing the semi-molten glass on the bed. Fig. 3. is a plan view of a sheet of glass after it has been rolled, the upper portion representing the plain unornamented sheet as it comes from the bed, while the lower portion is represented as being ornamented with and having fused thereinto coloring pigments of different colors, as represented by the black lines and the surface shading. Fig. 4. represents a cross section of a sheet of glass having one side only ornamented. Fig. 5, represents a similar view in which both sides are ornamented.

In the drawings:—A. represents the table bed having upon its operative surface the converse of the design with which it is desired to configure the sheet of glass. In this instance for convenience of illustration I will describe the design as illustrated in Fig. 3. as the design in use on this table, but it is obvious that any desired design may be used and substituted for the one herein shown.

As the converse of the design illustrated in Fig. 3 is formed into the glass casting table A. I will proceed with a description of this figure in which, the configured portions which may or may not be similar, are preferably formed on the bed by knurling, engraving, etching, hammering, &c. After these designs are placed upon the bed I then take the same and form grooves *a* throughout its entire surface, which groove may or may not be in the form of a regular design, as it is obvious that by the use of a planer or routing machine any desired design may be traced upon the bed in the form of straight lines or curves that may be desired. When the bed has been suitably ornamented the glass is rolled into sheets as in the ordinary method.

To configure both sides of the sheet with a like design at one and the same operation, I may utilize the following roll C. upon the face of which a design corresponding with the one on the bed plate, is formed. As is usual this following roll travels to the rear and in the path of the advance flattening roller B. as is shown in Fig. 2. This figure aptly illustrates the forms as shown in Figs. 4 and 5 in that the sheet of glass to the rear of the following roll is shown as being ornamented on both sides, and were the flattening roller dispensed with the resultant product would be similar to that shown in Fig. 4, or as illustrated between the flattening roller and the following roll in Fig. 2. After the steps above enumerated have been taken, and the resultant sheet of glass is in the form as illustrated at the top of Fig. 3, I take a more fusible glass of any desirable color, pulverize it, and by the admixture of turpentine or other suitable mixing fluid, convert the same into a fluid mass. This mixture is then applied on the raised or ribbed portion, as illustrated in the lower portion of Fig. 3. If desired, I may also ornament the surfaces between these raised portions, in which instance, I may use any suitable coloring in the fusible glass, pulverize, mix, and apply it the same as one of the ribs. When such coloring matter has been applied, the sheet of glass so ornamented is subject to a heat sufficient to fuse the pigment of the coloring matter, at which time the turpentine or other mixed fluid with the pulverized glass is evaporated, and the pigment or remaining sediment which has been converted into a molten state, becomes a part of the sheet of glass, thus making the sheet and its coloring pigment a homogeneous mass. A sheet of glass thus ornamented has, to the eye of an ordinary observer without close examination, the appearance of that expensive article known to the trade as leaded glass, having present many advantages thereover among which it will be sufficient to mention its high resistance to lateral strain, and small cost of production.

I do not wish to be understood as confining myself to the exact design as herein illustrated, nor the roller process I have shown in forming the sheet of glass, as it is obvious that in some instances, especially, where the sheet is to be small, it might be found practical to cast, or press the same, if an intricate design were desired to be transfigured.

Having thus described my invention, what I claim, and desire to secure by Letters Patent of the United States, is—

1. The process herein described for making imitation leaded glass, which consists in first rolling the same and forming raised portions or ribs thereon, in imitation of the leads in leaded glass, while it is being rolled, then painting said raised portions or ribs, to make them more nearly resemble leads, and finally, subjecting the rolled and painted sheet to a heat sufficient to fuse the pigment of the coloring matter on the raised ribs, into the sheet, substantially as and for the purposes described.

2. The process herein described for making imitation leaded glass, which consists in first rolling the same, and forming thereon while it is being rolled, raised portions or ribs, in imitation of the leads in leaded glass, and ornamenting the surfaces between the ribs with one or more designs or configurations, in imitation of different grades or makes of glass, second, in painting the ribs to make them more nearly resemble the leads, and finally in subjecting the rolled and painted sheet to a heat sufficient to fuse the pigment of the coloring matter on the raised ribs, into the sheet, substantially as and for the purposes described.

In testimony whereof I hereunto affix my signature, in presence of two witnesses, this 23d day of February, 1893.

EDWARD WALSH, JR.

Witnesses:
F. R. CORNWALL,
HUGH K. WAGNER.